United States Patent [19]

Wardell

[11] Patent Number: 5,020,722

[45] Date of Patent: Jun. 4, 1991

[54] SELECTIVELY CONTROLLABLE SPRINKLER SYSTEM FOR LAWNS, YARDS, GARDENS AND THE LIKE

[76] Inventor: Marvin H. Wardell, 4301 Wild Ivy Ct., Arlington, Tex. 76016

[21] Appl. No.: 444,280

[22] Filed: Dec. 1, 1989

[51] Int. Cl.⁵ .................. A01G 25/00; B05B 15/06
[52] U.S. Cl. .................................. 239/1; 239/276; 239/288
[58] Field of Search .............. 239/1, 200, 273, 276, 239/280, 288.3, 288; 248/75, 76, 79, 80, 87, 156, 530, 533, 545, 85; 138/89

[56] References Cited

U.S. PATENT DOCUMENTS

| | | |
|---|---|---|
| 1,555,207 | 9/1925 | Hojo . |
| 2,564,465 | 8/1951 | Clark . |
| 2,852,307 | 9/1958 | Clark . |
| 3,066,769 | 12/1962 | Pasquale ........................ 248/156 |
| 3,095,148 | 6/1963 | Smith ............................. 239/276 |
| 3,703,993 | 11/1972 | Schreiner . |
| 3,734,545 | 5/1973 | Stout . |
| 4,010,901 | 3/1977 | Sheets ........................... 239/288.3 |

FOREIGN PATENT DOCUMENTS 2096565 10/1982 United Kingdom .................. 138/89

*Primary Examiner*—Andres Kashnikow
*Assistant Examiner*—Lesley D. Morris
*Attorney, Agent, or Firm*—Charles W. McHugh

[57] ABSTRACT

A mounting and placement system for the periodic and manual placement of one or more sprinkler heads around a yard or other area that needs periodic watering, said sprinkler heads being advantageously made in accordance with conventional designs. A shank or spike depends from the body of such water sprinklers, said spike being downwardly tapered to a point. A plurality of generally tubular anchor members are sized and configured to telescopically receive the spike of the sprinkler. The lower end of the anchor member is squeezed together to form a more narrow, bladelike shape to foster entry into the ground. To ensure that the top of the anchor member is not damaged by any axial blows as it is being driven into the ground, an impact-resistant plug may be temporarily placed in the open top of the anchor member. But the lower end is left partially open so that rain water and the like may drain from the anchor member. By sequentially associating the sprinkler with each anchor member, the entire yard can be watered. If desired, a resilient plug may then be inserted into the open top of each of the permanently installed anchor members.

3 Claims, 1 Drawing Sheet

U.S. Patent    June 4, 1991    5,020,722
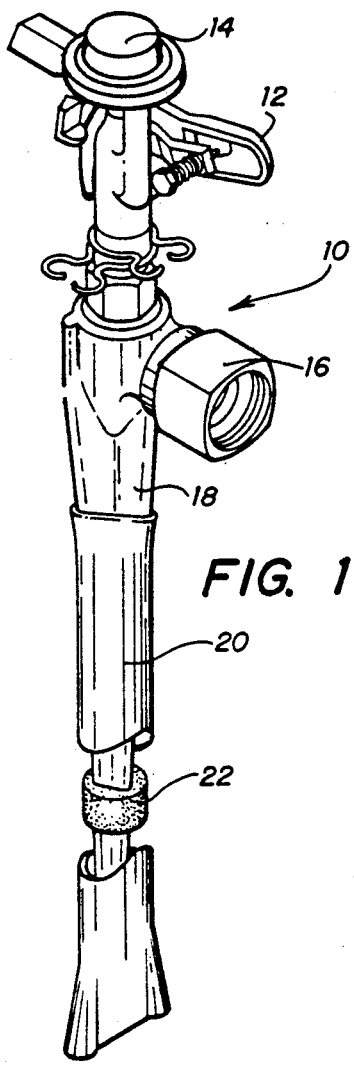
FIG. 1
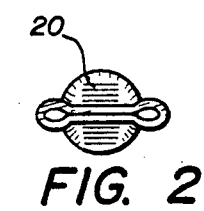
FIG. 2
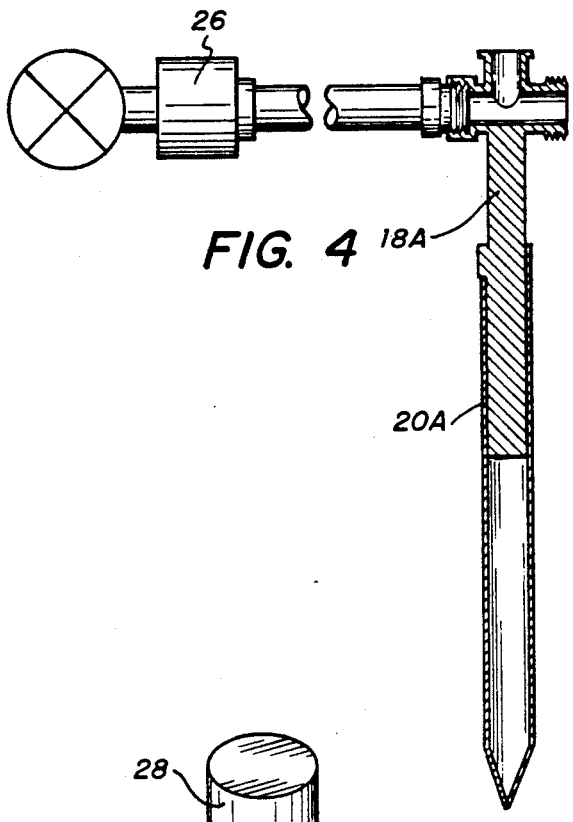
FIG. 4
FIG. 5
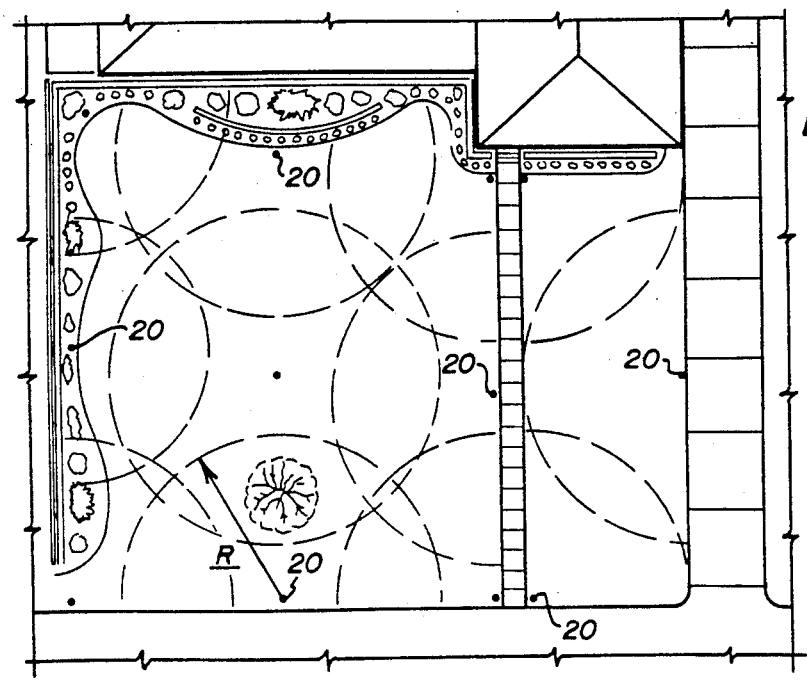
FIG. 3
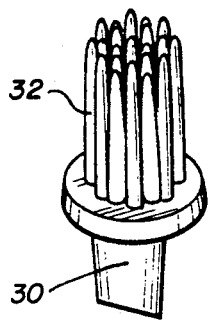
FIG. 6

SELECTIVELY CONTROLLABLE SPRINKLER SYSTEM FOR LAWNS, YARDS, GARDENS AND THE LIKE

BACKGROUND OF THE INVENTION

This invention relates generally to a method and apparatus for repetitively watering a lawn, yard or garden, etc., with a sprinkler; more specifically, it relates to a technique for repetitively placing a single sprinkler head in a plurality of preselected positions where there will be assurance that the sprinkler will adequately and completely furnish water to a selected area.

It is known that some persons are fortunate enough to have both lawns and sufficient available water so that they may use that water to foster the growth and maintenance of healthy grass. It is also known that such persons may accomplish the watering task in at least three ways. First, an individual sprinkler head may be connected to a water hose and manually placed around the yard at points that seem to be appropriate for achieving a desired amount of watering. Another technique involves a mechanized or somewhat automated sprinkler which traverses a track or path that has been defined by someone for the purpose of moving a sprinkler from one spot to another without manual intervention. A more sophisticated, but also much more expensive, technique involves the establishment of buried supply lines and a plurality of permanently located sprinkler heads that pop up when they are pressurized. With such in-ground or buried supply systems, the sprinkler heads are positioned so that they will repetitively furnish water to a person's lawn on whatever schedule seems to be desirable. Indeed, with any of the three systems described herein, automatic timers can be utilized so that water sprinkling may commence at a desired time, continue for as long as seems to be appropriate, and then automatically shut down.

Of the three systems described so far, the in-ground system is naturally the easiest to use, the fastest, and is probably the most dependable as far as providing a uniform and dependable watering pattern. However, there are at least four reasons why an in-ground watering system might not be appropriate for many persons. The first reason is the expense involved with installing such a system. It is not unusual for the installation of an in-ground system to cost on the order of 30 to 45 cents per square foot of lawn. And persons who are renting or leasing a house, or who plan to move within a few years and wish to avoid any unnecessary capital expenditures, may find that in-ground systems do not seem to make good economic sense, even though such persons might wish to promote and sustain a healthy, green lawn for the number of months or years that they occupy a particular house.

A second reason for opting to forego the benefits of an in-ground watering system relates to climate and the fact that water at atmospheric pressure freezes at 32° Fahrenheit. In northern climes where the temperature routinely drops below freezing for extended periods, extra care must be taken to bury supply lines very deep and to provide for draining water out of the system in order to "winterize" it. But attempts to completely drain deeply buried water pipes are not always successful, and many in-ground sprinkler systems in northern states are frequently in need of repair after a severe winter. When those who don't already have such a system see that their neighbors regularly have problems that require significant repairs, it tends to discourage people from installing an in-ground system.

A third reason why in-ground systems are probably not the ultimate watering solution is that they are intended to be, are commonly sold as, and are generally considered to be, permanent. The consequence of this is that changing conditions in a person's yard-such as adding a new flower bed or a patio-can also involve making a major change in water pipes that are buried several inches in the ground. This can also mean removing one or more sprinkler heads and having an adverse effect on an elaborate watering plan for a yard, or digging new ditches to relocate existing pipes or new ones. Therefore, the inability to easily change an in-ground system to meet new conditions makes it necessary that a person plan very carefully before ever installing such a system-and then never make any significant changes in a yard.

A fourth reason why in-ground systems are not necessarily the ultimate for all people is that available water may vary from year to year. If a drought should prompt a city to ask that residents voluntarily cut back on the consumption of non-essential water, a person may wish to continue to water certain shrubs, flowers and trees but to quit watering the grass, allowing it to subsist on whatever rainwater may fall. But if the shrubs, flower gardens and trees are all served by the same in-ground system that is used to water the grass, there is no way to segregate one area from the others. This would be analogous to having to simultaneously turn on every single faucet in a residence when someone only wanted to get a single glass of water in the kitchen. Fortunately, our houses and buildings are routinely built in such a way that we can selectively turn on a single faucet without wasting water at all other outlets at the same time. It would be desirable to be able to have a similar degree of control over the sprinklers in a yard, lawn, garden, etc. It is therefore an object of this invention to provide at least some selective control over water supply to a yard and the like without losing the benefits of any of the work that goes into establishing a planned supply system.

Another object is to provide a water-sprinkler system that offers some of the advantages of an in-ground system without incurring the substantial expense of such systems.

A further object is to provide a system that is sufficiently permanent as to probably satisfy nearly all persons but which is also sufficiently flexible that it may be altered without the necessity of ruining a perfectly good lawn or hiring a crew of skilled craftsmen.

These and other objects will no doubt be apparent from a reading of the specification and the claims appended thereto, with appropriate reference to the several figures of the drawing provided herewith.

DESCRIPTION OF THE FIGURES OF THE DRAWING

FIG. 1 is a perspective view of an exemplary water sprinkler connected to an anchor member in accordance with this invention;

FIG. 2 is a bottom plan view of an anchor member showing two opposed sides squeezed together to form a wedge shape;

FIG. 3 is a top plan view of an exemplary yard in which a plurality of anchor members are installed;

FIG. 4 is an elevation view of a combination of a sprinkler and an anchor member and a timer for controlling the amount of water that is supplied during one watering session;

FIG. 5 is a view of an adaptor which facilitates the application of axial forces to the top of an anchor member-for installing an anchor member in hard soil; and FIG. 6 is a perspective view of a plug that can be selective placed in the open top of an anchor member during those times when a water sprinkler is not installed.

BRIEF DESCRIPTION OF THE INVENTION

In brief, the invention described herein may be thought of as a mounting and placement system for the periodic and manual placement of one or more sprinkler heads, said sprinkler heads being advantageously made in accordance with conventional designs-so that replacement parts and the like might be readily obtained from the many commercial vendors of such heads. Firmly connected to each of the sprinkler heads is a body with a connection for threadably receiving the male end of a common water hose. A shank or spike depends from the body of the water sprinkler, said spike being downwardly tapered to a point-so that it may be manually forced into the ground with some ease. The length of the spike will typically be about six to nine inches, in order to support the sprinkler head above ground level.

In accordance with this invention, a plurality of generally tubular anchor members are provided, each of which is sized and configured to receive the spike of a commercially available sprinkler. An advantageous material for fabricating the anchor members is ¾ inch galvanized electrical conduit. Each anchor member is linear and has two ends, one of which is left open to receive the spike and the other end being squeezed together to form a more narrow, blade-like shape to foster entry into the ground. An adaptor is advantageously provided to fit into the open top of an anchor member during the time that it is being forced into really hard ground; this is especially useful if hammer blows are required to push the member into hard ground. For use in watering a lawn, an anchor member about 12 inches long will typically be pushed into the ground far enough so that its open top is essentially flush with ground level. For watering a garden or a flower bed, a longer anchor member will typically be utilized, so that the sprinkler head will be mounted a substantial distance above ground level. A means is also provided to prevent the unwanted rotation of the spike with respect to the anchor member, so that a spike can be repeatedly inserted into and removed from a given one of a plurality of anchor members without altering the orientation of the sprinkler head with respect to an installed anchor member.

In use, a plurality of anchor members are placed in the ground at what seem to be desirable locations for a water sprinkler to be used in order to create a pattern for covering the lawn, yard or garden, etc. a sprinkler head is then manually placed in the open top of what will be called the first one of the anchor members, and a water hose is connected to it. Water is supplied at a rate that is established by the owner, either by use of an automatic timer or individual judgement. The sprinkler head is then removed from the first anchor member and carried to the second, where it is temporarily installed in order to provide water in a pattern associated with the second anchor member. The process of sequentially associating the sprinkler with each anchor member is repeated until the entire area has been watered. Of course, individual judgement may also be employed to omit one or more locations, just as judgement may be employed with this system to postpone watering until it is really needed. So if it rains on a Saturday when watering is usually accomplished, common sense will dictate that there is no need to furnish sprinkler water on top of rainwater.

After a desired amount of watering has been accomplished, a resilient plug may be inserted into the open top of each of the anchor members. By making the plugs some color other than green, they will be readily contrasted with the adjacent grass and it will be easy to find each of the buried anchor members-until such time as their respective locations have been memorized through frequent use. A contrasting color will be especially useful if someday it is decided to change the watering pattern around a yard, and a particular anchor member is removed from the ground and then relocated several feet away. Contrasting colors will also be helpful in locating anchoring members if the watering pattern is established by one person (such as a parent) and the actual watering is later accomplished by another person (such as a child). When watering has been completed, the water hose and sprinkler are simply returned to their storage spots until they are again needed. The plurality of anchor members are, of course, left in the ground, where they will remain until someday it is decided to remove them.

DETAILED DESCRIPTION OF A PREFERRED EMBODIMENT OF THE INVENTION

Referring initially to FIG. 1, a device 10 is herein disclosed for facilitating the controlled and repetitive placement of a portable lawn sprinkler 12 adjacent an area that is to be periodically watered. The lawn sprinkler 12 is preferably of a commercially available type having a sprinkler head 14, a body with a water hose connection 16, and an elongated shank or spike 18 that is intended to be forced into the ground to temporarily anchor the lawn sprinkler for use. The configuration of the spike 18 may be of essentially any conventional shape, including a square, an "X," a triangle, etc. That is, any shape other than circular will normally be quite adequate for the horizontal cross-sectional area of the spike. Circular shapes (which would be obtained from a conical spike) will normally be avoided because they are not subject to being fixedly held in the position in which they are manually placed. Expressed in other words, a conical or cylindrical spike would likely tend to rotate with respect to its supporting medium (around a longitudinal axis) in the same way that a cylindrical bearing rotates within a journal. On the other hand, an elongated shank having a primarily cylindrical configuration can be made to work, provided that it also has some kind of a protruding "ear" or key that serves to lock the cylindrical shank to a single position with respect to an anchor member. Such an "ear" configuration would require special tooling in order to mass produce products, however, and would normally not be economically competitive with the preferred cross-sectional shapes.

A generally tubular anchor member 20 is provided as a major component of the claimed construction. A preferred anchor member 20 is formed from a piece of elongated and tubular stock having an inner diameter that is just large enough to receive the elongated spike 18. The length of the anchor member 20 should be sufficient to telescopically receive at least most of the sprinkler's elongated spike. By using conventional tubular stock to fabricate the anchor members, appreciable economies in manufacture can be realized, and special-purpose tooling can be minimized.

The bottom of the anchor member 20 has two of its opposite sides at least partially squeezed together to form a wedge shape-when seen in a bottom plan view, as shown in FIG. 2. The wedge shape is effective to foster entrance of the anchor member 20 into the ground when axial blows are applied to the top of the anchor member. The wedge shape is also effective to resist rotation of the anchor member 20 about its longitudinal axis after the anchor member has been forced into the ground. This shape is therefore markedly different from the cylindrical shapes for spikes that are shown in U.S. Pat. Nos. 2,564,465 to Clark entitled "Lawn Sprinkler" and 3,734,545 to Stout entitled "Irrigation Connection."

Referring still to FIG. 1, a means is provided for ensuring that the elongated spike 18 can be sequentially inserted into an anchor member and removed therefrom numerous times—without altering the orientation of the spike (and its attached sprinkler head) with respect to the anchor member. In FIG. 1, this means is illustrated as a generally horizontal disk 22 that is rigidly fixed to the interior of an anchor member at an elevation where it will make intimate contact with the spike 18 at about the time that the sprinkler 12 reaches a suitable elevation with respect to ground level. By using a plurality of anchor members 20 and suitably positioning them around a yard or other area that is to be watered, a person may establish a satisfactory watering pattern for a yard one time; thereafter, he or she will be assured that an identical watering pattern will be produced every time that the lawn sprinkler 12 is sequentially inserted into each of the plurality of anchor members. That is, by leaving the anchor members permanently embedded in the ground, a person need only put the lawn sprinkler in the anchor members and allow water to pass through the sprinkler in order to accomplish the desired watering task. As long as the pattern was correctly established when the anchor members were initially placed in the ground, there need be no further concern about ensuring that every portion of the lawn is adequately watered. A relatively unskilled person can rather mechanically follow a ritual of placing a sprinkler in each anchor member and turning on a valve or metering device to supply water. Even a young child can "help Daddy" by moving the sprinkler from one spot to another around the yard. In view of the fact that it is easy to define an orderly routine (e.g., clockwise) for moving a lawn sprinkler 12 from one anchor member to another, there is essentially negligible risk that a person might overlook one of the anchor members 20 and thereby fail to water some segment of a lawn.

On the other hand, if there should be some desire to deliberately alter an initially established watering pattern, it is easy to exercise individual judgment in the placement of the sprinkler 12 in selected ones of the anchor members. So if some condition should warrant a temporary change in a watering pattern, there is no need to go to the expense of making permanent changes in a water supply system. A person in charge of doing the actual watering can simply bypass one or more anchor members 20 and thereby conserve the water that would otherwise have been used. And if a home owner wishes to water a region containing shrubbery or flowers with some extra watering time, it is not necessary to water the entire yard—which would be the case if the yard, shrubbery and flower gardens were all connected to a unitized and permanently installed sprinkler system. Similarly, if a community is experiencing a water shortage and has asked residents to cut back on their consumption of non-essential water, a home owner can place a lawn sprinkler 12 in only those anchor members 20 that are positioned where they will cause water to fall on regions that are deemed to be most important, i.e., the shrubs and flowers, thereby leaving merely grassy areas unwatered.

Referring next to FIG. 3, an exemplary yard adjacent a residence is shown in plan view. The yard includes many of the problems that are sometimes encountered by owners, including spaces that are relatively narrow, and both inside and outside corners. In this example, several different anchor members 20 are shown permanently installed in the yard, and broken lines defined by a radius R indicate the typical watering pattern that can be achieved when a sprinkler 12 is located at each of the anchor members and water is supplied to the sprinkler. As is typical with modern lawn sprinklers 12, adjustments are possible to produce variable areas of lawn coverage, e.g., 90 degrees, or 180 degrees, or indeed practically any selected angle of coverage from essentially zero to a full 360 degrees. By placing multiple anchor members 20 in the desired locations and initially establishing the water pattern that is believed to be best for this particular yard, a person need only have a single lawn sprinkler 12 that can be combined with each of the plurality of anchor members in order to dependably and repeatedly water the yard in a predictable manner, week after week, etc. It would be possible to have multiple sprinkler heads, of course, including one that is set to produce a 90 degree arc of coverage, one to produce 180 degrees of coverage, and another to produce 360 degrees of coverage. Color coding the multiple sprinkler heads to match colored plugs would help ensure that a yard is always completely covered.

Adding a timer in series between a water hose and the hose connection 16 (as shown in FIG. 4) can relieve a person from any concern about how long to supply water to a sprinkler 12 when that sprinkler is placed at a selected one of the anchor member locations. Using such a timer 26, a person may choose to allow a relatively small, 90 degree corner section to supply water for a shorter time than would be appropriate for, say, a 360 degree area. The selective adjustment of watering times, based on individual judgment, is also a convenient and advantageous feature of this construction.

For the primarily grassy areas of a yard, ¾-inch galvanized steel tubing having a length of about nine inches will provide an excellent anchor member 20 for accommodating essentially all water sprinklers having more or less conventional spikes. Water sprinklers contemplated as being serviceable with this invention are manufactured by companies such as Thompson Manufacturing Company of Chino, Calif.; L. R. Nelson Corp. of Peoria, Ill.; Gilmore Manufacturing Company of Somerset, Pa.; and Rainbird Sprinkler Manufacturing Corp. of Glendora, Calif. By taking advantage of the availability of sprinkler heads that can already be found at hardware stores and the lawn and garden departments of major discount stores, the economies that are available from mass production and standardization can be exploited with this system. Anchor members having a nine-inch length can typically be forced or hammered into the ground with a modest amount of force, so that the top of the anchor member will be flush with ground level.

To ensure that the open top of an anchor member will not be damaged as it is being vigorously hammered into hard soil, an adaptor is advantageously provided to temporarily fill the open top of the anchor member and transfer downwardly directed forces to the anchor member. An exemplary adaptor 28 made of nylon or similarly tough material is illustrated in FIG. 5.

When properly installed, the top of the rigid anchor member 20 will not extend above ground level where it might be struck by a passing lawn mower or even felt by a child running through the grass. For regions of a yard that have shrubbery or tall, blooming flowers (such as gladioli), it is advantageous to form an anchor member from tubular stock having a length in excess of two feet. Such a long anchor member will serve to hold a lawn sprinkler at an elevated location, so that water can be easily sprayed over an area that is typically taller than mowed grass. Regions that can benefit from a relatively tall anchor member include those that encompass flower beds, shrubbery, ground cover and garden plants such as tomato, okra, etc. Anchor members may also be tilted away from vertical when they are installed, if it is desired to achieve some special effect in establishing a watering pattern.

An important feature of the anchor member 20 is that its bottom is preferably open, at least to some extent—in order to foster the draining of accumulated rain water in order that the anchor member will not become a breeding place for mosquitoes. This can be readily achieved by squeezing the sides of tubular stock enough to cause two opposite sides to collapse (to form the desired wedge shape for the bottom of an anchor member) but not so much as to bring the opposite sides into full contact with one another. In other words, deliberately leaving one or more small gaps or openings in the bottom of an anchor member will permit any accumulated rain water to drain out of the bottom of an anchor member. One or more drain openings that, in total, provide at least 0.05 square inches of drain area constitutes the preferred embodiment for an anchor member bottom.

When a means for draining rain water out of an anchor member has been built into the anchor member, there is a negligible requirement that the top of an installed anchor member be closed when the anchoring member is not in use. That is, an anchoring member having a diameter of ¾ inch will have a top opening of less than ½ square inch. Such a small opening will not pose a risk even to average pets that might happen to step directly on top of the anchoring member. Nevertheless, some persons may prefer to close the top of an installed anchor member in order to keep the interior of the anchor member free of leaves, grass clippings and other debris. For those who wish to utilize a top closure, the preferred form constitutes a resilient plug having a plurality of narrow, finger-like protrusions that can be made thin enough to simulate grass blades. Such a plug 30 is shown in FIG. 6, and the base of the plug is sized and shaped to fit snugly into the top of each of the anchor members. The flexible protrusions or blades 32 extend longitudinally of the plug 30 for whatever length seems to be desirable. As supplied by the manufacturer, such protrusions or blades may be about two inches long. But relatively soft material can be readily shortened by the purchaser using household scissors. Alternatively, the purchaser can simply mow over the installed plugs and let the lawnmower blade establish how far the blades 32 extend above a buried anchor member 20.

To facilitate locating the buried anchor members in a dense lawn, the plugs 30 may be formed from material that will enhance their visibility. For example, if the plugs 30 are molded of a material that can be dyed with, say, an orange pigment, the location of a buried anchor member 20 will be easy to spot from a distance as short as five or six feet. But the number of blades (typically eight or so) on a typical plug 30 would not be so prominent as to make them particularly noticeable from a distance of, say, thirty feet. Therefore, such plugs with a contrasting color would not likely offend the eye of even a fastidious lawn owner.

When this disclosure has been fully understood, it should be apparent that a watering system in accordance with this invention will be slower to use than fully automatic, in-the-ground sprinkler systems of the prior art. On the other hand, there are some very favorable tradeoffs that are realized by giving up the speed of automation. For one thing, there is the initial cost of materials and labor to install a system as disclosed herein. Conservative calculations including the cost of 100 feet of conventional water hose will likely run between 2 and 3 cents per square foot of yard, while in-ground systems that are installed by professional yard care companies will usually run between 30 to 45 cents per square foot. And of course there is what may be called the "salvage" value of this system when the owner decides to move to another house. With this system, everything can be removed from the ground and carried to a new home; but with in-ground systems, the owner must walk off and leave his or her investment in the sprinkler system with the house that is left behind. A person does not even have to be what we'd describe as frugal to appreciate that it might hurt a little to be forced to walk away from a sprinkler system costing perhaps thousands of dollars. It should also be remembered that there is much greater control with the system described herein, and the monthly consumption of water can also be affected more readily than with in-ground systems. It follows, therefore, that there are many benefits that can be realized with the system described herein.

While only the preferred embodiments of the invention have been disclosed herein, it should be apparent to those skilled in the art that variations and modifications can be made without departing from the spirit of the invention. Therefore, it should be understood that the invention's scope should be measured only by the claims that are appended hereto.

What is claimed is:

1. A device for facilitating the controlled and repetitive placement of a portable lawn sprinkler adjacent an area that is to be periodically watered, said lawn sprinkler being of the type that has a sprinkler head, a water hose connection and an elongated spike that is intended to be forced into the ground to temporarily anchor the lawn sprinkler for use, comprising:

a. an elongated and generally tubular anchor member formed from a piece of tubular stock, said anchor member having an inner diameter that is just large enough to receive the elongated spike of the lawn sprinkler, and the length of the anchor member being sufficient to telescopically receive at least most of the sprinkler's elongated spike, and the bottom of the anchor member being at least partially squeezed together to form a wedge shape when seen in a plan view, said wedge shape being effective to foster entrance of the anchor member into the ground and to resist rotation of the anchor member about its longitudinal axis after it has been forced into the ground, and the anchor member being flattened near its bottom by squeezing together two opposite sides of the generally tubular stock, such that the anchor member is essentially flattened adjacent the middle of the bottom end, but the bottom of the anchor member is still partially open at its two edges, whereby any rainwater that might otherwise collect in an open top of the anchor member is permitted to drain downwardly out of the two openings at its two edges;

b. means for ensuring that the elongated spike of the lawn sprinkler can be sequentially inserted into each of a plurality of anchor members with the same relative orientation, after each anchor member has been forced into the ground with a generally vertical orientation and with its top being accessible, whereby a water-hose that is in communication with the water-hose connection can be used to supply water to the water sprinkler at selected times, and whereby the water sprinkler will provide a repetitive and predictable pattern of watered area because the water sprinkler can be repeatedly placed in each anchor member with an identical orientation every time that the water sprinkler is installed.

2. A device for facilitating the controlled and repetitive placement of a portable lawn sprinkler adjacent an area that is to be periodically watered, said lawn sprinkler being of the type that has a sprinkler head, a water hose connection and an elongated spike that is intended to be forced into the ground to temporarily anchor the lawn sprinkler for use, comprising:

a. an elongated and generally tubular anchor member formed from a piece of tubular stock, said anchor member having an inner diameter that is just large enough to receive the elongated spike of the lawn sprinkler, and the length of the anchor member being sufficient to telescopically receive at least most of the sprinkler's elongated spike, and the bottom of the anchor member being at least partially squeezed together to form a wedge shape when seen in a plan view, said wedge shape being effective to foster entrance of the anchor member into the ground and to resist rotation of the anchor member about its longitudinal axis after it has been forced into the ground;

b. means for ensuring that the elongated spike of the lawn sprinkler can be sequentially inserted into each of a plurality of anchor members with the same relative orientation, after each anchor member has been forced into the ground with a generally vertical orientation and with its top being accessible, whereby a water-hose that is in communication with the water-hose connection can be used to supply water to the water sprinkler at selected times, and whereby the water sprinkler will provide a repetitive and predictable pattern of watered area because the water sprinkler can be repeatedly placed in each anchor member with an identical orientation every time that the water sprinkler is installed; and c. a resilient plug that is sized to fit into and completely fill the open top of the anchor member when a sprinkler is not installed therein, such that the entrance of dirt and water into an anchor member may be blocked when the elongated spike of a water sprinkler is not inserted therein, and the top of the plug having a plurality of narrow finger-like protrusions that are configured to simulate grass blades, and the length of the finger-like protrusions being relatively great and the material from which the protrusions are made being relatively soft, such that the blades of a lawn mower will readily cut the finger-like protrusions to a height that is essentially the same as that of the adjacent grass, whereby the finger-like protrusions of a given plug will blend in with the adjacent grass and the long-term presence of a plurality of resilient plugs in a yard of grass will be aesthetically pleasing.

3. The method of periodically watering a yard, garden or other area containing grasses and plants, comprising the steps of:

(a) placing a plurality of anchor members at various fixed locations around the yard, garden or other area that is to be watered, with each of the locations being separated from an adjacent location by a distance that approximates the distance that a jet of water can be propelled by a water sprinkler, and the anchor members having a vertically oriented structure with an open top for receiving a portable water sprinkler and holding the same in a fixed orientation; and (b) sequentially placing the water sprinkler at selected ones of the locations where the plurality of anchor members are fixed, and temporarily connecting the water sprinkler to respective ones of the anchor members in such a way that the relative orientation of the water sprinkler with respect to a given anchor member is the same every time that the water sprinkler is connected, and the water sprinkler also being connected to a source of pressurized water, whereby water may be sprayed by the water sprinkler in a consistent and repeatable pattern every time that the water sprinkler is connected to an anchor member; and (c) placing in the open tops of each of the vertically oriented anchor members a resilient plug that is effective to prevent the entrance of dirt and water into an anchor member when a water sprinkler is not connected therewith, and said resilient plugs being configured with a plurality of upwardly extending and thin fingers that are simulative of grass, said fingers being relatively long but being of soft material that will be easily cut when a lawn mower passes thereover, whereby the installed resilient plugs will be cut to a length of the adjacent grass and will be ornamentally harmonious with the adjacent grass instead of being in aesthetic conflict therewith.

* * * * *